No. 842,970. PATENTED FEB. 5, 1907.
O. G. PARSONS.
GATE OR DOOR HOOK.
APPLICATION FILED SEPT. 29, 1905.

Witnesses:

Ozro G. Parsons,
Inventor,
by C. A. Snow & Co.
Attorneys.

UNITED STATES PATENT OFFICE.

OZRO G. PARSONS, OF EDINA, MISSOURI.

GATE OR DOOR HOOK.

No. 842,970.     Specification of Letters Patent.     Patented Feb. 5, 1907.

Application filed September 29, 1905. Serial No. 280,646.

*To all whom it may concern:*

Be it known that I, OZRO G. PARSONS, a citizen of the United States, residing at Edina, in the county of Knox and State of Missouri, have invented a new and useful Gate or Door Hook, of which the following is a specification.

This invention relates to gate or door hooks.

The object of the invention is in a ready and practical manner to preclude the possibility of an animal unfastening the hook by rubbing against it, to cause the hook to be operative under all conditions even though it should become distorted or bent, as from strains, and to preclude the possibility of a person pinching or otherwise injuring his hand in an attempt to release the hook from the staple or keeper.

With the above and other objects in view, as will appear as the nature of the invention is better understood, the same consists in the novel construction and combination of parts of a gate or door hook, as will be hereinafter fully described and claimed.

Figure 1:
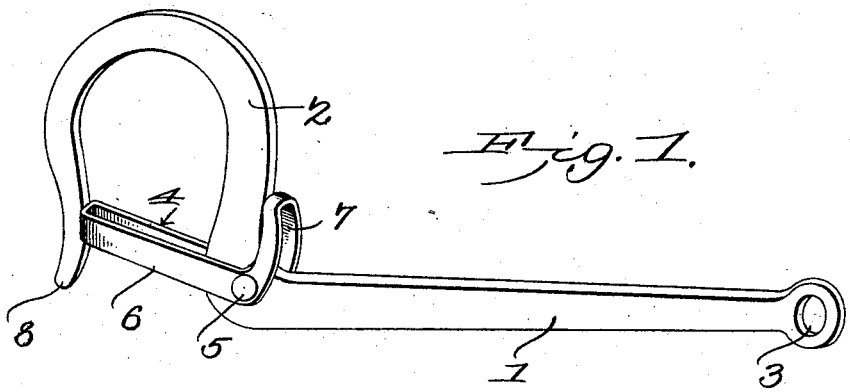
Figure 2:
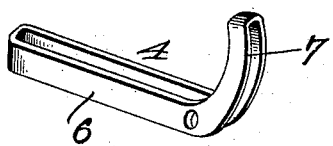

In the accompanying drawings, forming a part of this specification, and in which like characters of reference indicate corresponding parts, Figure 1 is a view in perspective of a hook constructed in accordance with the present invention. Fig. 2 is a perspective detail view of the novel form of keeper combined with the hook.

The hook may be of the usual or any preferred construction and in this instance is shown as comprising a shank 1, having at one end a hook proper, 2, and at its other end an eye 3, through which will be driven a staple to secure the article to a gate or door.

The present invention resides in a novel form of keeper that is combined with the hook to prevent its becoming accidentally detached from its staple, as by an animal rubbing against it. The keeper 4 (shown in detail in Fig. 2) is in the nature of a link the members of which are so spaced as to straddle the hook and are secured thereto at the angle or bend of the shank by a rivet 5. The body 6 of the keeper is herein shown as straight, while its rear portion is curved upwardly and constitutes a stop 7, which by contact with the outer portion of the hook will positively preclude any possibility of the nose or outer end of the keeper from dropping out of engagement with the bill 8 of the hook should the latter be distorted or deflected from its normal position, as from strains. Further, the stop 7 serves as a thumb-piece by which the keeper may be thrown out of engagement with the bill, thereby rendering it unnecessary for the operator to dispose his finger under the keeper to lift it when the hook is to be released from its staple. By the employment of the stop it will be seen that the keeper will be caused to be operative under all conditions, inasmuch as it will always occupy a predetermined position relatively to the shank irrespective of the bill of the hook and will thereby be rendered thoroughly effective for the purposes designed.

Having thus described the invention, what is claimed is—

1. The combination with a hook, a keeper straddling the hook-shank and adapted to engage the hook whereby its movement in one direction is limited.

2. The combination with a hook of a keeper having an angular extension which straddles the hook-shank and engages the hook and limits the movement of the keeper in one direction.

3. The combination with a hook of a keeper pivotally connected therewith and which straddles the hook, a stop attached to the keeper and which straddles the hook, said stop adapted to engage the hook to limit the movement of the keeper in one direction.

4. The combination with a hook, a keeper pivoted to the hook, a stop attached to the keeper and having a transversely-extending portion adapted to engage the hook, said keeper having a transversely-extending portion, the side portions of the keeper and stop being in the same plane.

In testimony that I claim the foregoing as my own I have hereto affixed my signature in the presence of two witnesses.

OZRO G. PARSONS.

Witnesses:
   P. L. PARSONS,
   THOMAS O'DONNELL.